Feb. 21, 1967  J. WUNDERLICH  3,304,681

DECORATIVE-STRIP MOUNTING ASSEMBLY

Filed Sept. 21, 1964  3 Sheets-Sheet 1

JOACHIM WUNDERLICH
INVENTOR.

BY Karl J. Ross

AGENT

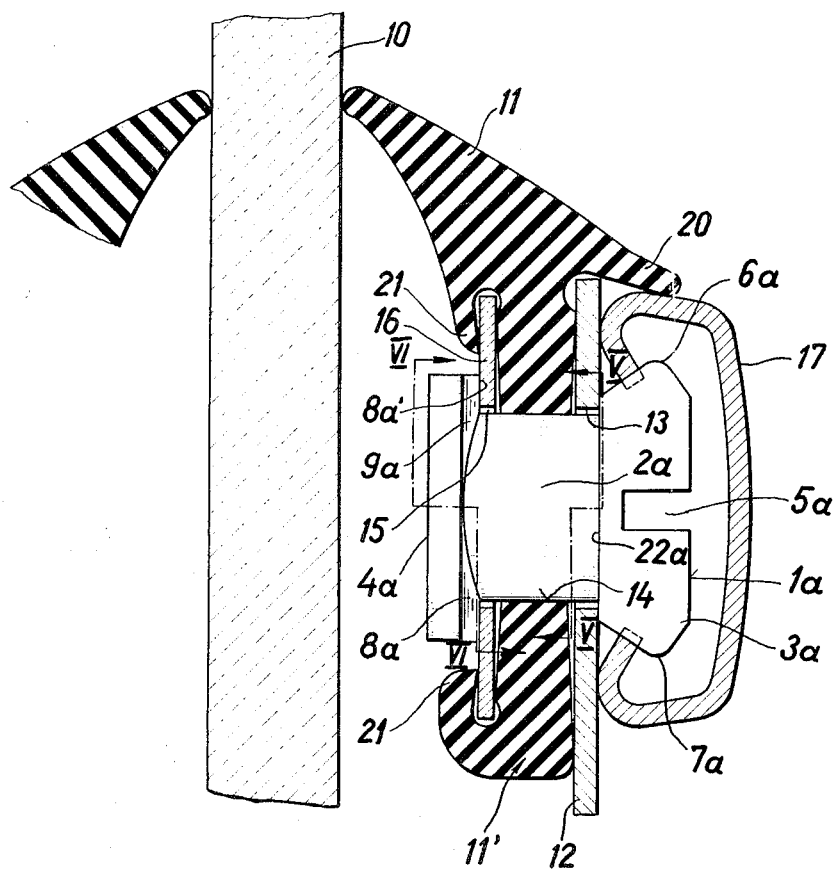

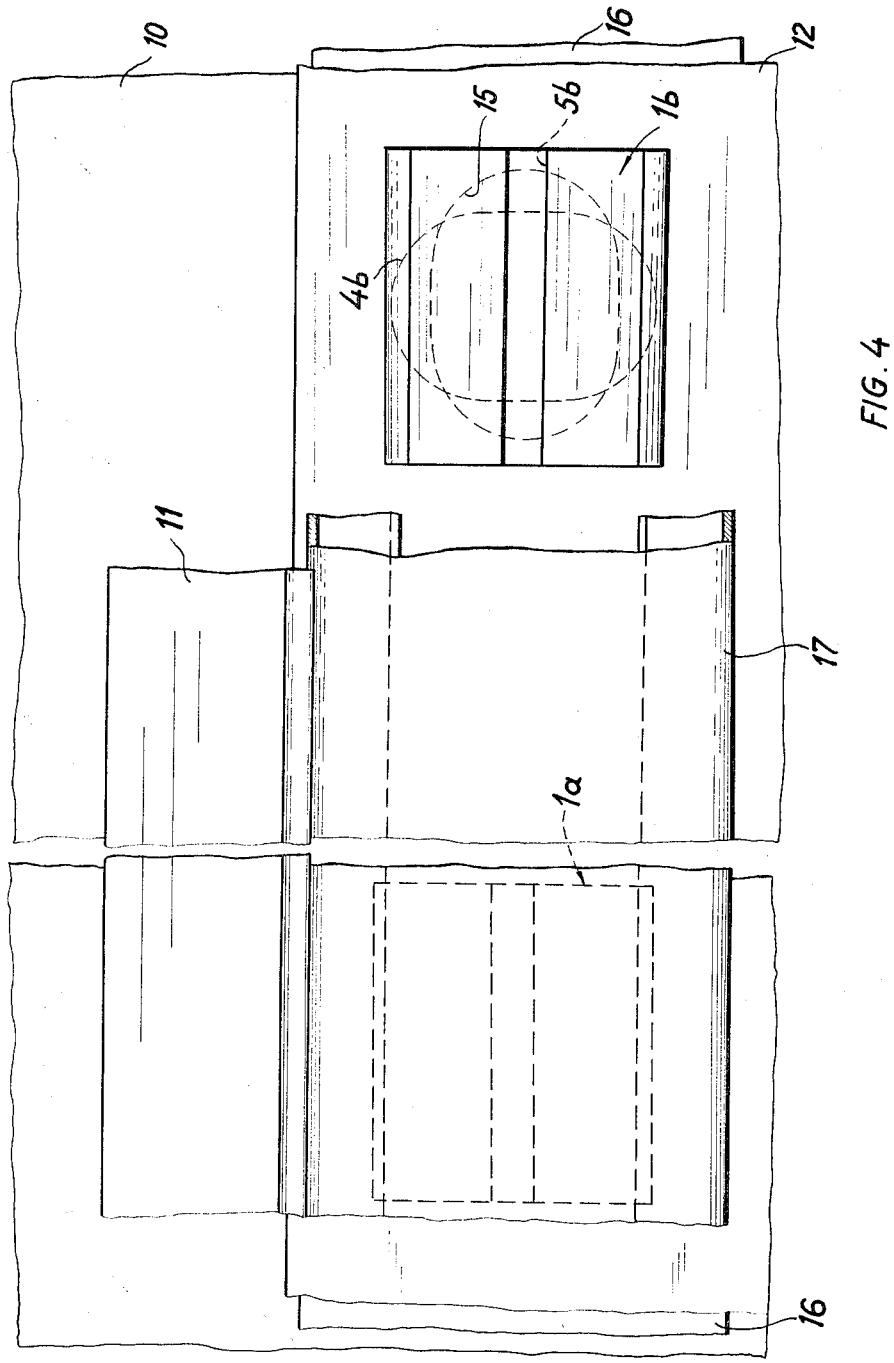

United States Patent Office 3,304,681
Patented Feb. 21, 1967

3,304,681
DECORATIVE-STRIP MOUNTING ASSEMBLY
Joachim Wunderlich, Ingolstadt, Germany, assignor to Auto Union G.m.b.H. (Gesellschaft mit beschrankter Haftung), Ingolstadt (Danube), Germany, a corporation of Germany
Filed Sept. 21, 1964, Ser. No. 397,792
Claims priority, application Germany, Sept. 20, 1963, A 44,096
3 Claims. (Cl. 52—397)

The present invention relates to fastening means for sealing strips and other strip-like elements as well as sheet materials and, more particularly, to a fastening means for securing strips and sheet elements to a body.

Many fastening devices have been provided heretofore for securing strip-like and sheet-like materials to a wall of a body and such devices have found widespread application in the affixing of sealing or weather-stripping to structural and vehicular bodies, especially in the region of the windows thereof. In an automotive vehicle, for example, an elastomeric weather-strip or sealing band is generally applied along both the movable and the immovable window panes for sealing these against the weather around their edges. Such sealing strips are mounted upon the motor-vehicle body by fastening devices of the character mentioned above. The present invention bears upon window structures for automotive vehicles of this latter type as well as to other systems wherein a strip or sheet-like element can be affixed to a body, preferably also of sheet-like configuration.

Conventional fastening devices for this purpose, generally comprise spring-loaded or resilient clamping members which can be pressed into recesses or openings of the carrying plate or wall and which affix other parts to the support. There is also a conventional system in which a fastening bolt or pin passes through the parts to be connected and holds them together between an abutment and a clamping member. In practice, however, these clamping devices are found not to give complete satisfaction or security and deteriorate rapidly by corrosion, such corrosion markedly reducing the resiliency and holding characteristics of the clamps. It is also a disadvantage that these conventional devices frequently require several parts in the clamping assembly aside from the sealing strip, any backing or reinforcing strip and the support. This multipartite device is relatively expensive to manufacture and thus is generally avoided.

It is the principal object of the present invention, therefore, to provide an improved fastening means for strip and sheet-like materials whereby they can be secured to the wall of a body in a simple and economical manner.

A more specific object of this invention is to provide a fastening system of the general character described wherein the abovementioned disadvantages of conventional devices are avoided and which does not require previous assembly of a number of parts prior to the use of the fastening element.

A further object of this invention is to provide a weather-strip assembly for automotive-vehicle bodies and other structures which is simple and yet secure against vibration, shock and corrosion.

These objects and others which will become apparent hereinafter are attained, in accordance with the present invention, by providing a fastening means which includes a rotatable fastening element having a shank portion and a transverse portion receivable in an elongated opening of the wall to which the fastening element is to be secured and rotatable to cammingly secure the fastening element in place. For this purpose, the transverse portion of the fastening element is provided with ramp-like inclined surfaces adapted to engage the rear surface of a sheet-like element or wall and, upon rotation of the fastening element in bayonet fashion to displace this rear surface axially with respect to the fastening element. Thus the fastening element can be provided with a head or the like against which the fastening assembly is seated and is compressed by the ramp-like surfaces upon rotation of the fastening element. It is advantageous if at least part of the assembly is resiliently compressible in the axial direction or if the fastening element is made somewhat resilient. Since the locking or fastening action is a result of the camming action of the ramp-like surfaces upon rotation of the fastening element, it is not necessary to force the transverse portion of this element through an underside aperture and thereby strain the transverse portion. Moreover, the device can be assembled quickly and conveniently with a minimum number of operations. The fastening element of the present invention can also be more massive and stronger than conventional fastening elements which rely upon their inherent resiliency to hold the parts in place.

According to a more specific features of the present invention, the fastening element comprises both head and foot enlargements extending generally transversely to the bolt-like, generally cylindrical intermediate or shank portion, the foot enlargement constituting the transverse portion referred to above and being generally elongated along a diameter of the fastening element. The fastening element can then be inserted foot first through a similar elongated slot or opening in the assembly to be secured and the fastening element rotated through an angle of, say, 90° so that the elongated transverse portion of the fastening element underlies a rear surface of the assembly. The later includes the generally planar wall to which the device is to be affixed as well as the member to be attached to this wall. A window-strip assembly of this character can include the wall of the vehicle body, a weather strip or fillet underlying or overlying this wall, and a metallic reinforcing strip sandwiching the fillet between itself and the wall. The transverse portion of the fastening element, with its ramp-like surfaces, thus can engage either of the two rigid parts namely the wall of the body and the reinforcing or backing strip so that the elastomeric weather strip is compressed upon rotation of the fastening element. The members of the assembly are provided with similar elongated and registering openings through which the fastening element can be inserted and have a collective thickness in an uncompressed state which is less than or just equal to the axial length of the fastening element from the abutment surface of its head to the bottom of the ramp surface. In a compressed state of the assembly, its collective thickness is equal to substantially the axial length of the shank from the abutment surface of the head to the upper part of the ramp. The device has particular value for systems wherein the collective thickness of the assembly may vary from situation to situation since a number of standard fastening elements may be prepared, all of which differ only with regard to the axial length of the shank portion. The dimensions of the remaining parts of the fastening elements can be the same in all cases. It is not possible to standardize conventional spring elements in a similar manner. It should be noted that the resiliency required for the compressive fastening of the assembly can be obtained in several ways. It is most convenient if the elastomeric sealing strip is resiliently compressible at the region at which it is engaged by the fastening element. In addition, namely the wall member on the reinforcing strip member can be dished to provide a spring action in the manner of a Belleville washer. Alternatively the fastening element can be composed of an elastically compressible synthetic resin having an inherent resiliency.

According to still another feature of the invention, the head enlargement of the fastening element also extends transversely to its shank and is of prismatic configuration to enable engagement by a wrench or the like or to facilitate insertion of the device and its tightening by hand. It has been found to be preferable, however, to provide a central transverse slot in this head to accommodate a tool, such as a screw driver, for the tightening of the element. The elongated head may, moreover, be undercut along its longitudinal edges or formed with bulges therealong against which an ornamental covering strip or the like can be lodged. The ornamental strip can be of channel profile and engage the undersides of the longitudinal edges while covering the head of the fastening element. The ornamental strip can extend along a row of fastening elements and can thus prevent them from rotating and loosening in the assembly. The fastening element has a dual function in that it serves both to mount the sealing strip and connect several parts in addition to providing a seat for the ornamental strip. Similarly, the ornamental strip has the dual function of covering the heads of the fastening elements and inhibiting their loosening.

The above and other objects, features and advantages of the present invention will become more readily apparent from the following description, reference being made to the accompanying drawing in which:

FIG. 3 is a vertical cross-sectional view through an assembly making use of a fastening element similar to that of FIGS. 1 and 2;

FIG. 4 is an elevational view, partly broken away, of this assembly;

Figure 1:
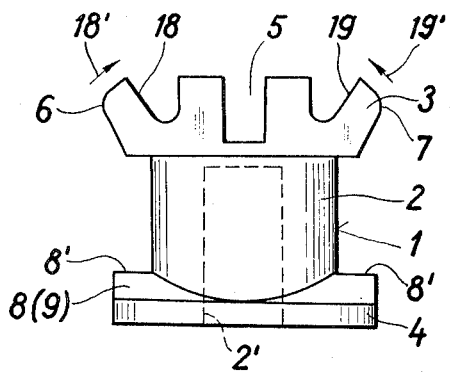
FIG. 1 is a side-elevational view of a fastening element, according to the invention.
Figure 2:
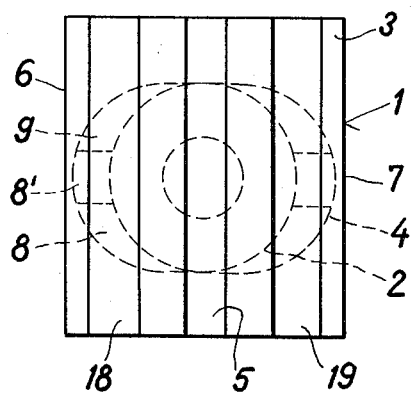
FIG. 2 is a top view of this element.

In FIGS. 1 and 2 of the drawing I show a fastening element 1 having a generally cylindrical and bolt-like intermediate or shank portion formed with a central passage 2′ and having a transverse head 3 of prismatic configuration (FIG. 2) and an elongated transverse foot 4. The head portion 3 of the fastening element is provided with an elongated slot 5 adapted to receive the blade of a tool (e.g. screw driver) as well as a pair of undercut longitudinal edges 6, 7 in the form of bulges which enable a decorative covering strip to be applied to the head 3 with snapper action as will be evident from FIGS. 3 and 4. The longitudinal edges 6 and 7 are carried by the elongated resiliently deformable flanges 18 and 19, respectively produced by longitudinal resisting of the head 3. The flanges 18 and 19 can thus be resiliently displaced in the direction of arrows 18′, 19′ to permit removal of the decorative strip and ensure its engagement when this strip is forced over a row of heads of the fastening elements. The transversely extending foot portion 4 is of oval configuration (broken lines in FIG. 2) and is provided with gabled, inwardly inclined ramps or flange surfaces 8, 9 in the direction of the shank portion 3. At a diametral plane of the fastening element through the major dimension of the foot portion 4, the latter can be flattened at 8′ so as to seat in surface-engaging relationship against the rear face of the assembly.

Figure 5:
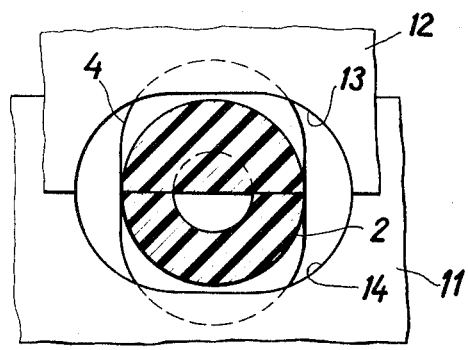
FIG. 5 is a cross-sectional view taken along the line V—V of FIG. 3.
Figure 6:
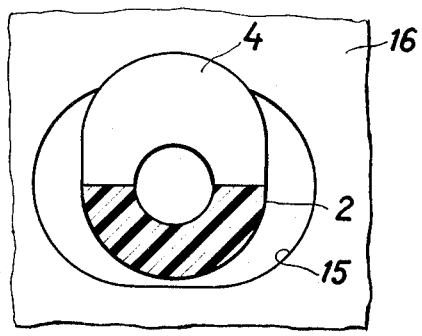
FIG. 6 is a cross-sectional view taken along the line VI—VI of FIG. 3.

Referring now to FIGS. 3 and 4, in which the fastening elements 1a, 1b are identical to the fastening element 1 except that the recesses forming the flanges 18 and 19 are eliminated, it may be seen that an assembly for weatherstripping an automotive vehicle can include an elongated elastomeric sealing strip 11 extended along the entire length of a window pane 10 and affixed to a wall 12 of a motor-vehicle body by a plurality of aligned fastening elements 1a, 1b, etc. From FIGS. 3, 5 and 6, it will be seen that the sealing strip 11 has a web portion 11′ formed with an elongated opening 14 of oval configuration adapted to pass the foot 4a of the fastening element 1a. The wall 12 of the vehicle body is provided with a similar opening 13 and is abutted by the strip 11 which has an extension 20 overlying the upper edge of this wall 12, thereby covering it to prevent corrosion and passage of water and other contaminants between the wall and the window pane 10. The web 11′ of the sealing strip 11 is also formed with a pair of flap-like flanges 21 under which a somewhat dished backing element 16, extending along the strip 11, is received.

In order to mount this assembly, the sealing strip 11, and the backing strip 16 have their oval openings 14 and 15 in registering relationship and aligned with the similar opening 13 of wall 12. The major dimensions of these openings may extend, as shown in FIG. 3, in the principal dimension of the strips. The fastening element 1a is then inserted foot first through the openings until its foot portion 4a is disposed behind the rearmost surface of strip 16. A screw driver can now be inserted in the slot 5a of head 3a to rotate the fastening element through approximately 90° (see fastening element 1b of FIG. 4). The dimensions of the fastening element are so selected that the axial length of shank 2a (FIG. 3) between the abutment surface 22a of head 3a and the surfaces 8a′ at the upper end of the ramps 8a, 9a is less than the relaxed collective thickness of the assembly consisting of parts 11′, 12 and 16. The ramps 8a and 9a, however, commence in a plane whose axial spacing from surface 22a can be equal to or slightly greater than the collective relaxed thickness. It will be evident, therefore, that rotation of the fastening element 1a through an angle of 90° will force the backing strip 16 to rise up on the ramps 8a, 9a until brought into surface engagement with faces 8a′, i.e. the position of the device illustrated in FIG. 3. Since the backing strip 16 is somewhat dished, it is resiliently compressed as is the web portion of sealing strip 11′ and the entire assembly is fixed in place. The flaps 8a′ prevent spontaneous loosening of the fastening element by limiting the tendency thereof to rotate. An ornamental strip 17 of stainless or chromium-plated steel, aluminum or the like, can then be forced over the bulge edges 6a, 7a of the head 3a which extends parallel to the strips 11 and 16. The relaxed position of this channel-shaped member 17 is shown by a dot-dash line in FIG. 3 and the strip is resiliently locked in place behind the undercut longitudinal edges. As will be evident from FIG. 4, the strip engages a plurality of fastening elements 1a, 1b etc. and further secures them against rotation while covering them in an esthetic manner. The removal of the cover strip 17 is facilitated by providing the longitudinal edges 6, 7 on the resiliently deflectible flanges 18, 19. In FIG. 4, fastening element 1b is identical with fastening element 1a and thus has the pertinent portions thereof designated with similar reference numerals although followed by a "b."

The invention described and illustrated is believed to admit of many modifications within the ability of persons skilled in the art, all such modifications being considered within the spirit and scope of the appended claims.

I claim:

1. A decorative-strip mounting assembly comprising, in combination with a wall portion of a vehicle body lying along a window pane thereof, a rotatable fastening element having a foot portion, a shank and a head portion and insertable through an opening in said wall portion and rotatable for locking said fastening element in said opening; a resiliently compressible strip behind said wall portion and bearing upon said pane and compressed between said foot portion and said head portion of said fastening element; and a decorative strip extending along said wall portion on a side thereof opposite that upon which said resilient strip is provided and engaging said head portion of said fastening element while completely enclosing same.

2. The combination defined in claim 1 wherein said shank is generally cylindrical and has an axial length at least equal to the thicknesses of said wall portion and said compressible strip, said foot portion extending transversely of said shank and having a side engageable behind a rear surface of said compressible strip sloping away therefrom and forming a ramp-like cam adapted to compress said compressible strip upon rotation of said shank to offset angularly said opening and said foot portion, thereby preventing withdrawal of said element through said opening, with said shank and remote from said foot for engagement with a front surface of the other of said members to clamp said members between said head and said foot upon said rotation of said head portion being of generally rectangular outline and having a pair of longitudinally resilient parallel flanges extending outwardly of said shank along opposite edges of the head portion for engagement with said decorative strip, said flanges being defined by transversely spaced parallel channels formed in said head portion remote from said shank and delimiting between them a raised portion of said head.

3. The combination defined in claim 2 wherein said raised portion of said head is slotted parallel to said channels for receiving a tool for rotating said shank, said foot being of generally elliptical configuration with a major axis perpendicular to said channels.

References Cited by the Examiner

UNITED STATES PATENTS

| | | | |
|---|---|---|---|
| 2,172,924 | 9/1939 | Gwinn et al. | 24—221 X |
| 3,116,526 | 1/1964 | Cochran | 24—73 |
| 3,190,167 | 6/1965 | Holton | 24—73 X |
| 3,220,078 | 11/1965 | Preziosi | 85—5.2 X |

FOREIGN PATENTS 922,967 4/1963 Great Britain.

FRANK L. ABBOTT, *Primary Examiner.*

ROBERT S. VERMUT, *Assistant Examiner.*